Oct. 2, 1956 — M. L. HOOVER — 2,765,458
LUMINOUS ROD READ-OUT DEVICE
Filed Sept. 6, 1955 — 2 Sheets-Sheet 1

INVENTOR
Martin L. Hoover

By Earl Beust
Louis A. Kline
John J. Matlago
His Attorneys.

Oct. 2, 1956　　　　M. L. HOOVER　　　　2,765,458
LUMINOUS ROD READ-OUT DEVICE
Filed Sept. 6, 1955　　　　　　　　　　2 Sheets-Sheet 2
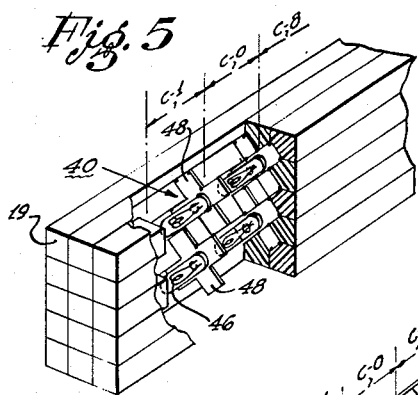
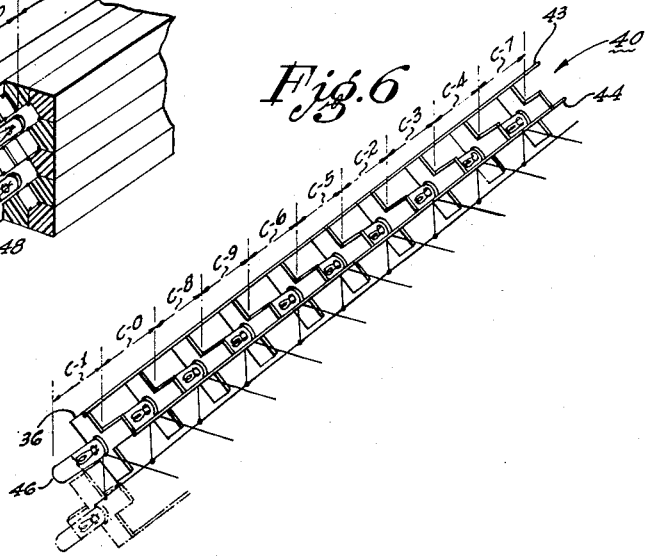
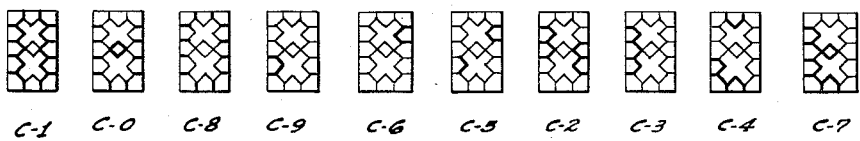
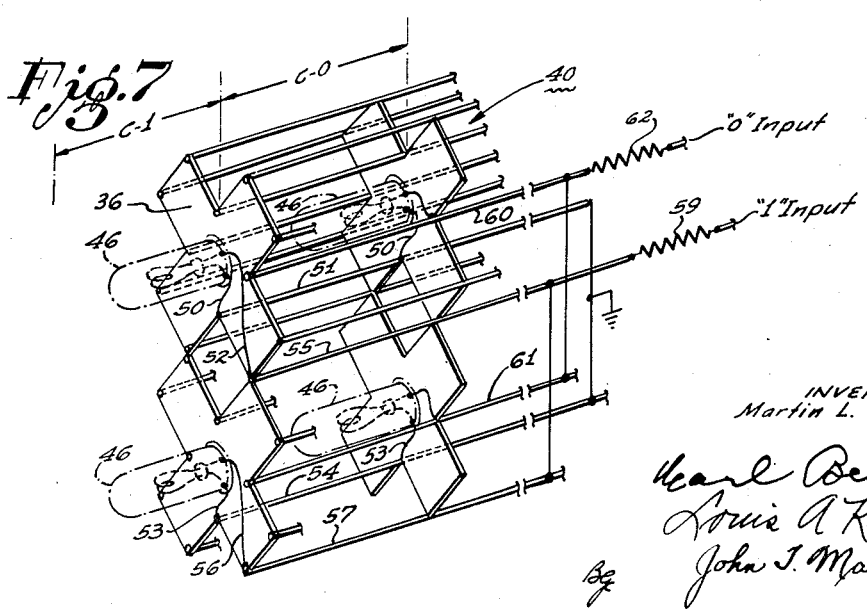
INVENTOR:
Martin L. Hoover
His Attorneys United States Patent Office 2,765,458
Patented Oct. 2, 1956

2,765,458

LUMINOUS ROD READ-OUT DEVICE

Martin L. Hoover, Downey, Calif., assignor to The National Cash Register Company, Dayton, Ohio, a corporation of Maryland Application September 6, 1955, Serial No. 532,568

6 Claims. (Cl. 340—332)

This invention relates to visual readout devices, useful in digital computers and the like, and more particularly to a readout device constructed from a plurality of light-transmissive rods.

The problem of providing efficient, fast-acting visual readout devices is especially significant in the digital computer field. For example, it is highly desirable to have means for visually indicating through a viewing window any of the decimal digits 0 to 9, and have each digit, as selected, to be located in the same relative area. Furthermore, in order to be able to operate with high-speed electronic equipment, it is advantageous to have these digits controlled so that they appear and disappear at the viewing window in direct response to electrical signals generated by this equipment.

Briefly, the present invention comprises a plurality of light-transmissive rods positioned on a framework having a series of laterally positioned shields, thereby forming light chambers along the length of the stacked rods. A pair of rods, as assembled, are cut short to provide space for positioning a light bulb in each chamber, while the edges of the remainder of the rods are appropriately shaped to provide surfaces into which light rays may be directed. Portions of the exposed surfaces of the rods in each chamber are appropriately coated with an opaque reflector such that, when the light bulbs housed within the chambers are illuminated, a specific character is transmitted to the viewing window formed by the end of the rods.

One of the objects of this invention is to provide a novel arrangement for stacking light-transmissive rods about a plurality of light sources so that when the rods are viewed from the end thereof, any one of a desired number of characters may be observed.

Another object of this invention is to provide a novel framework for a series of light bulbs, the framework being so constructed and arranged that a plurality of light-transmissive rods may be easily positioned thereon to provide a visual readout device.

Still another object of this invention is to provide an efficient, direct-reading device that is of simple, rugged construction.

Other objects and features of the invention relating primarily to details of construction and arrangement of parts will become apparent from the following description read in conjunction with the following drawings in which:

Fig. 5 is a cutaway view of a portion of the assembled readout device, showing how the lamp pairs are housed in the respective chambers formed along the central cutout portions of the rods.

Fig. 6 is a perspective view of the lamp and shield assembly used in the readout device.

Fig. 7 is a fragmatic perspective view showing in greater detail the electrical circuitry for the lamp and shield assembly presented in Fig. 6.

Fig. 8 is a series of cross-sectional views of the readout device showing how the rods are coated with an opaque substance to enable the respective decimal digits to be viewed at the face thereof.

Figure 1:
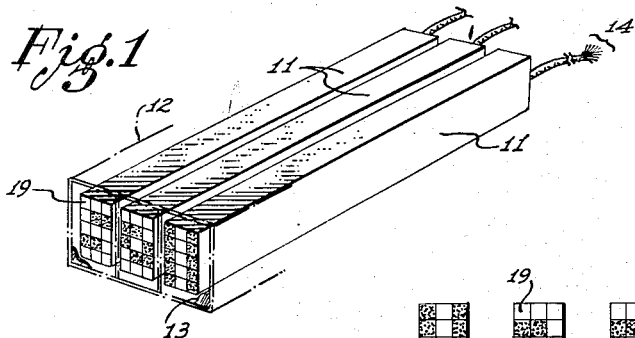
Fig. 1 shows a multi-stage register, utilizing the luminous rod readout devices herein disclosed.

Referring first to Fig. 1, three readout devices 11 of the type disclosed herein are shown mounted side by side within the confines of a chassis 12. Each readout device 11 is made up of a plurality of light-transmissive plastic rods, such as rod 19, for example. The rods are assembled to form a stack 3 rods wide and 5 rods deep. A group of digit leads extends from the rear of each device 11, such as digit leads 14. In order to cause a certain digit to appear illuminated on a readout device 11, as observed on window 13, it is only necessary to energize the appropriate digit lead. Thus, in Fig. 1, number 521 for example, is observed on window 13 by energizing the proper digit input lead of each of the readout devices 11. The source of such energization signals might be a digital computer, for example.

Figure 2:
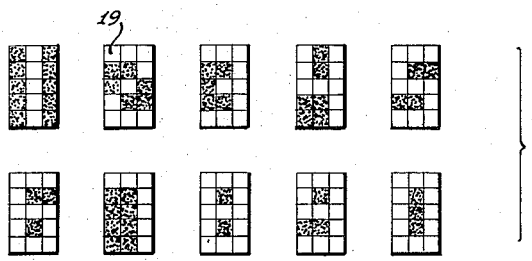
Fig. 2 is a series of diagrams illustrative of how any desired decimal digit may be defined at the face of the readout device shown in Fig. 1, by selective illumination of the rods.

The nature of certain plastic rods, as is well understood in the art, is such that light energy directed therein anywhere along their length is transmitted to the ends thereof. Thus by properly arranging the rods about a series of light sources, and by a predetermined coating of the exposed sides of the rods assembled around each light source, the ends of the rods, as viewed from the front of the device, are either lighted or blacked out so that the combination of illuminated rods resulting therefrom will display a desired decimal digit. Thus Fig. 2 shows a series of views of the face of the stack of light-transmissive rods comprising a readout device 11, clearly indicating that, by selectively illuminating certain rods from the stacked array, the lighted ends of the rods as viewed from window 13 will form any of the decimal digits 0 through 9.

Figure 3:
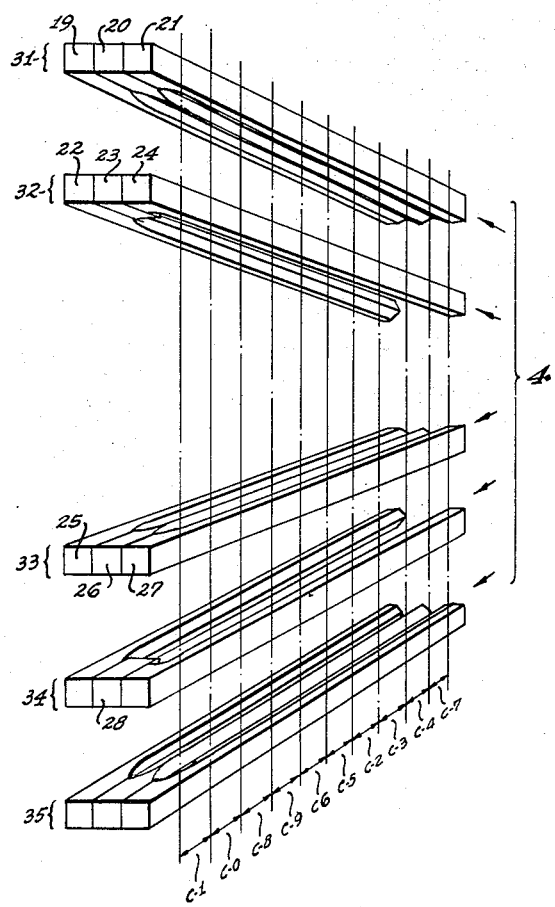
Fig. 3 is a perspective view showing how the rods, utilized in a preferred embodiment of the readout device, are cut and assembled.
Figure 4:
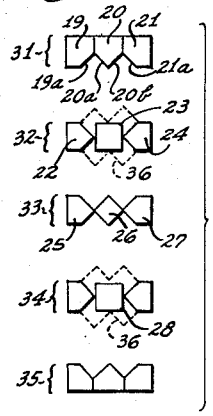
Fig. 4 is an end-view of the rod arrangement shown in Fig. 3.

In Fig. 3, there is presented a perspective exploded view showing the five rows of rods included in readout device 11, each row being made up of three rods. The first row 31 is comprised of rods 19, 20, and 21. The corner rods 19 and 21 each have their inside lower edges 19a and 21a, respectively, cut off starting from a point just back of the face of the stack as seen from Fig. 3, while center rod 20 has both of its inside lower edges 20a and 20b cut off. The second row 32 is comprised of rods 22, 23, and 24. Rods 22 and 24 have both their inside upper and lower edges cut off similarly to rod 20, whereas rod 23 is cut so as to extend only a short distance from the face of the stack, as viewed in Fig. 3. The third row 33 of rods is comprised of rods 25, 26, and 27. Of these, rods 25 and 27 are shaped identically to rods 22 and 24. However, rod 26 has all of its edges cut off, thus presenting a diamond cross-section, as viewed in Fig. 4. The fourth row 34 of rods is similar to the second row 32 in that center rod 28 is cut short, the same as rod 23; and the inside upper edges of the outside rods are cut off. The fifth row 35 has the upper inside edges of its rods cut similar to the lower inside edges of the rods in the first row 31. The shapes of the rods are further revealed by reference to the end-view of the rows of rods, as shown in Fig. 4.

When the rods are assembled, it should be noted that inasmuch as the central rods 23 and 28 in rows 32 and 34, respectively, of the stack are cut short, openings are provided behind these rods, which extend throughout the remaining length of the stack. These openings have an X-shaped cross-section because of the manner in which the edges of the rods are cut.

Reference will next be made to Fig. 6 showing a perspective view of the shield assembly 40 as utilized in a preferred embodiment of the invention. Two of these assemblies are included in each readout device 11. Each assembly is comprised of ten X-shaped shields 36, spaced to conform with the sections along the stack of rods as defined by the vertical lines in Fig. 3. The shields 36 are rigidly held in position by stiff wires 43 and 44 connected to the corners of each of the shields in the assembly 40. Shields 36 are preferably made of an insulating material and each has an incandescent lamp 46 mounted so as to extend from the center thereof. It should be noted that shields 36 must be opaque and their surfaces are preferably silvered so as to reflect light from the lit lamps 46 back into the chambers. Fig. 5 is a fragmatic cutaway perspective view, illustrative of the mounting of shield assemblies 40 within the upper and lower openings of the stack of shaped rods shown in Figs. 3 and 4, so that the shields define ten pairs of chambers C-1, C-0, etc. sequentially positioned along the length of the rod assembly.

It should now be understood from Fig. 2 that the central rods 23 and 28 in rows 32 and 34, respectively, of the stack are illuminated only for forming the digit "one." It is because of this that these rods are cut short, so that they extend only into the first section C-1 of the stack, which is thus reserved for forming the digit "one." It is the recognition of this expediency which makes it possible to have the upper and lower openings extend through the length of the stack in which the light bulbs can be positioned. Furthermore, it should be realized that the inside edges of the rods are cut off, as described in connection with Fig. 3, to provide surfaces for each of the rods into which light rays may be directed.

Reference is now made to Fig. 7 showing how the stiff wires, such as 43 (Fig. 6), supporting and positioning the shields in assembly 40 may be used as electrical conductors. A lead 50 from each lamp 46 of the upper bank is connected to a supporting wire 51 whose outer end is connected to ground. Similarly a lead 53 from each lamp 46 of the lower bank is connected to a supporting wire 54 whose outer end is likewise connected to ground. A second lead 52 of the upper lamp in section C-1 is connected to one of the wires 55, and a second lead 56 of the lower lamp in section C-1 is connected to another wire 57. Supporting wires 55 and 57 are connected in parallel to resistor 59 which is in turn connected to the digit "1" input lead. In a similar manner, the pair of lamps 46 in section C-0 are connected in parallel by way of wires 60 and 61 to the "0" digit input lead. Thus the lamps in each of the remaining sections are wired in parallel by use of the shield supporting wires. It is to be noted, however, that the pair of lamps might be wired in series, if so desired, the parallel arrangement being shown here for purposes of simplicity.

It should be noted that the intensity of illumination of the digits, as observed at window 13 (Fig. 1), is a further factor for consideration because lamps 46 are located at varying distances from the face of the stack. Thus in order to limit the intensity of the front lamps 46 and bring their value more in accordance with the more remotely positioned lamps in the stack, resistors of appropriate magnitude, such as resistors 59 and 62, for example, are connected in series with each pair of lamps, thus serving to provide uniformity of illumination of the digits as they are read out.

In order to further understand the operation of the readout device, consider next the series of cross-sectional diagrams presented in Fig. 8. These diagrams show how the internal surfaces of the rods in each of the sections C-1, C-0, C-8, etc. are coated so as to enable the desired digit to be illuminated on the face of the device 11. Thus the opaque silvered surfaces of the rods are represented by thick lines while the clear, polished surfaces are indicated by thin lines. The particular decimal digit which is accordingly transmitted to the screen of the readout device is depicted by respective illumination patterns, as is shown in Fig. 2. Thus by energization of selected lamps 46, as governed by a digital computer, for example, a certain decimal digit (from zero to nine) is displayed on window 13 (Fig. 1) of the stacked rod array. For example, as shown in Fig. 8, it is desired to utilize the first section C-1 of a readout device 11 to transmit a digit "one" to the window 13 when both lamps 46 therein are lit. Thus the internal surfaces of all of the rods in the C-1 cross-section shown, except the surfaces of the middle rods in the first, third, and fifth rows, have their surfaces coated with a suitable opaque reflector. In addition, of course, the ends of the short rods 23 and 28 extending into section C-1 are also clear, since these rods must be end-illuminated for forming this digit "one."

In the immediately following section C-0, the exposed surfaces of all the rods are clear and polished except diamond cross-sectioned center rod 21, all sides of which are opaque. The net result of this arrangement is that a light pattern corresponding to digit "zero" is transmitted to the face of device 11 when the two lamps 46 of this section are illuminated. And so the coating of the successive sections of the rod configuration proceeds, the surfaces of each section being painted with an opaque coating different from the other, depending upon which decimal digit is to be represented thereby.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A visual readout device comprising an arrangement of light-conductive rods; illuminating means positioned at successive sections along the length of said rods and within the confines thereof; a different light directive pattern of opaque coatings on the surfaces of said rods exposed to the illuminating means in each said section; and means for selectively energizing said illuminating means, whereby an intelligible character may be formed on the ends of said light conductive rods, dependent upon the light directive pattern of the section illuminated.

2. A visual readout device comprising a stacked arrangement of a plurality of light conductive rods formed with internal openings along the length thereof; a plurality of incandescent lamps positioned in successive sections along the openings of said stack, the surfaces of the openings in each said section being provided with a predetermined pattern of opaque coating; and shields positioned in the openings of said stack to separate each section from the next, whereby each said section when illuminated by said lamps transmits a particular character to the composite face formed by the ends of the rods.

3. A device of the class described comprising a rectangularly stacked arrangement of a plurality of light-conductive rods; a pair of light sources positioned in successive sections along the length of the rods; and an input led for each said pair of light sources, the portion of the rods housing each pair of light sources being so cut and so shielded that upon energizing an input lead the visual sensation of a specific character is transmitted to the screen formed by the ends of the rods.

4. In a visual readout device, a stacked arrangement of light-transmissive rods, some of said rods being cut shorter than others to define openings extending throughout the remainder of said stack; a pattern of opaque coating on the surfaces of the rods surrounding said openings; and a framework comprising a plurality of insulator shields and lamps positioned in the openings of said stack, said framework including wires extending through the length of said stack to which the corners of the shields are connected for holding the latter in spaced relationship, and each said lamps having a lead connected to different one of said wire connectors, whereby a particular character may be formed on the face of said stack by energizing a respective one of said wire connectors.

5. A visual readout device comprising fifteen plastic rods, said rods being stacked into a rectangular arrangement three rods wide and five rods deep, the rods immediately above and immediately below the center rod of the stack being short length rods; and an assembly of incandescent lamps and shields positioned in the openings of said stack in line with the short length rods to define light chambers along the length of said stack, the exposed surfaces of the rods in each chamber being appropriately coated and polished, whereby a specific character is formed on the face of the stack when the lamps housed in a particular section thereof are illuminated.

6. A visual readout device comprising fifteen plastic rods, said rods being stacked into a rectangular arrangement three rods wide and five rods deep, the rods immediately above and immediately below the center rod of the stack being short length rods; and an assembly of electrical bulbs and shields positioned in the openings of said stack in line with the short length rods to define light chambers in ten successive sections of said stack; the exposed surfaces of the rods in the first section, including the ends of the short length rods, being appropriately coated and polished to transmit the digit "1" to the face of the stack when the bulbs housed therein are illuminated, and the exposed surfaces of the rods in each of the remaining sections being appropriately coated and polished to transmit a respective one of the remaining decimal digits to the face of the stack dependent on the bulbs illuminated.

References Cited in the file of this patent

UNITED STATES PATENTS

| | | |
|---|---|---|
| 2,203,630 | Keen | June 4, 1940 |
| 2,703,189 | Trozmuller | Feb. 7, 1956 |

FOREIGN PATENTS

| | | |
|---|---|---|
| 212,955 | Switzerland | Jan. 13, 1940 |